United States Patent
Krug et al.

(10) Patent No.: US 7,072,198 B2
(45) Date of Patent: Jul. 4, 2006

(54) DC/DC CONVERTER HAVING IMPROVED REGULATION

(75) Inventors: James L. Krug, Carrollton, TX (US); David W. Evans, Plano, TX (US); J. Patrick Kawamura, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 94 days.

(21) Appl. No.: 10/681,887

(22) Filed: Oct. 9, 2003

(65) Prior Publication Data

US 2005/0077884 A1 Apr. 14, 2005

(51) Int. Cl.
*H02M 7/217* (2006.01)
(52) U.S. Cl. .................. 363/127; 363/16; 323/286; 323/224
(58) Field of Classification Search .............. 363/127, 363/46, 67, 81, 89, 82, 37, 45, 98, 125; 323/282, 323/283, 222
See application file for complete search history.

(56) References Cited

U.S. PATENT DOCUMENTS

| 5,457,624 | A | * | 10/1995 | Hastings | 363/127 |
| 5,814,976 | A | * | 9/1998 | Allison | 323/224 |
| 5,982,160 | A | * | 11/1999 | Walters et al. | 323/282 |
| 6,151,233 | A | * | 11/2000 | Kondo | 363/125 |
| 6,177,782 | B1 | * | 1/2001 | L'Hermite et al. | 323/222 |

* cited by examiner

*Primary Examiner*—Rajnikant B. Patel
(74) *Attorney, Agent, or Firm*—William B Kempler; W. James Brady, III; Frederick J. Telecky, Jr.

(57) ABSTRACT

A switching mode converter, having a switching transistor and an inductor, has a discontinuity detector coupled to the inductor which detects when the converter enters the discontinuous mode. The discontinuity detector determines the portion of the cycle of the switching transistor in which the converter is in the discontinuous mode. A feedback controller is coupled to the output of the converter and to the discontinuity detector which alters a feedback control signal of the converter.

13 Claims, 14 Drawing Sheets

DC/DC CONVERTER HAVING IMPROVED REGULATION

FIELD OF THE INVENTION

This application relates to a DC/DC switching converter having improved load regulation and especially to a DC/DC switching converter having improved load regulation in the discontinuous mode.

BACKGROUND OF THE INVENTION

One important figure of merit of a switching converter is load regulation, where it is desirable to have tight regulation over the entire load range. A switching converter (switching regulator) can be operated in a continuous mode or discontinuous mode depending on whether the current through the inductor decreases to zero during the switching cycle. As is well known to those skilled in the art, in continuous mode, the output voltage is independent of the load and is given by the formula:

Buck $$V_o = V_i(\delta) \quad (1)$$

Boost $$V_o = \frac{V_i}{1-\delta} \quad (2)$$

δ=Duty Cycle

Thus, the load regulation for a converter in continuous mode is very good. In fact, as shown by equations 1 and 2, the voltage regulation for a switching mode converter in continuous mode should be zero because of the output voltage is independent of the load although, in actual converters, there is still some small drop in the output voltage with increasing load due to parasitics.

In discontinuous mode, the output current is not large enough to keep the inductor current from going to zero during the cycle. A DC/DC switching converter operating in discontinuous mode has a smaller duty cycle for the same input and output voltage than one operating in continuous mode. This difference in duty cycle definition is what causes the output voltage to be larger in discontinuous mode and the load regulation to suffer. In converters having an error amplifier, the gain of the error amplifier allows the converter to operate with little change in output voltage during discontinuous mode. Utilizing an error amplifier in the design of a switching converter complicates the design of the controller because it must be compensated for changes in load and temperature. In addition, an error amplifier dramatically increases the current drain for the control circuit of the switching converter. Therefore, in small battery powered devices it is desirable to have a converter which does not require an error amplifier. In such converters, the output is compared directly to a ramp and therefore the output voltage has to change more dramatically in order to change the duty cycle. The greater the voltage difference between the output voltage and the ramp voltage, the more the converters will suffer from poor load regulation. Two factors that play a predominant role in determining at what load a converter transitions between discontinuous mode and continuous mode is the switching frequency and inductor size. Once these parameters are specified, the designer of the controller has no control over how wide of a load range places the converter in discontinuous mode and therefore is unable to avoid a large load regulation.

SUMMARY OF THE INVENTION

It is a general object of the invention to provide a DC/DC switching converter having improved voltage regulation in the discontinuous mode.

This and other objects and feature are attained in accordance with one aspect of the invention, by a switching mode converter having a switching transistor and an inductor and a discontinuous mode control circuit comprising a discontinuity detector coupled to the inductor that detects when the converter enters the discontinuous mode to generate a TRIP signal. The discontinuity detector determines the portion of a cycle of the switching transistor during which the converter is in discontinuous mode. A feedback controller is coupled to an output of the converter and to the discontinuity detector which alters a feedback control signal of the converter.

Another aspect of the invention includes a method for controlling a switching mode converter having a switching transistor and an inductor. Discontinuous flow of current in the inductor is detected. The amount of time for discontinuous current flow in the inductor is measured. The feedback characteristics of the converter are changed in response to the measured amount of time.

A further aspect of the invention comprises a switching mode converter comprising a switching transistor. An inductor is coupled to the switching transistor. A freewheeling diode is coupled to the inductor. A control circuit has a feedback loop from an output of the converter coupled to the control circuit, the feedback comprising a voltage divider. A discontinuity detector coupled to the freewheeling diode to determine discontinuous current in the inductor. A first timing circuit is coupled to an output of the discontinuity detector for measuring a portion of a converter cycle during which current in the inductor is discontinuous. A feedback control circuit is coupled to an output of the timing circuit and responsive thereto to alter a value of the voltage divider.

BRIEF DESCRIPTION OF THE DRAWINGS

FIGS. 11A–11D are a circuit implementation of the schematic block diagram of FIG. 7;

DETAILED DESCRIPTION OF THE PRESENT INVENTION

Figure 1:
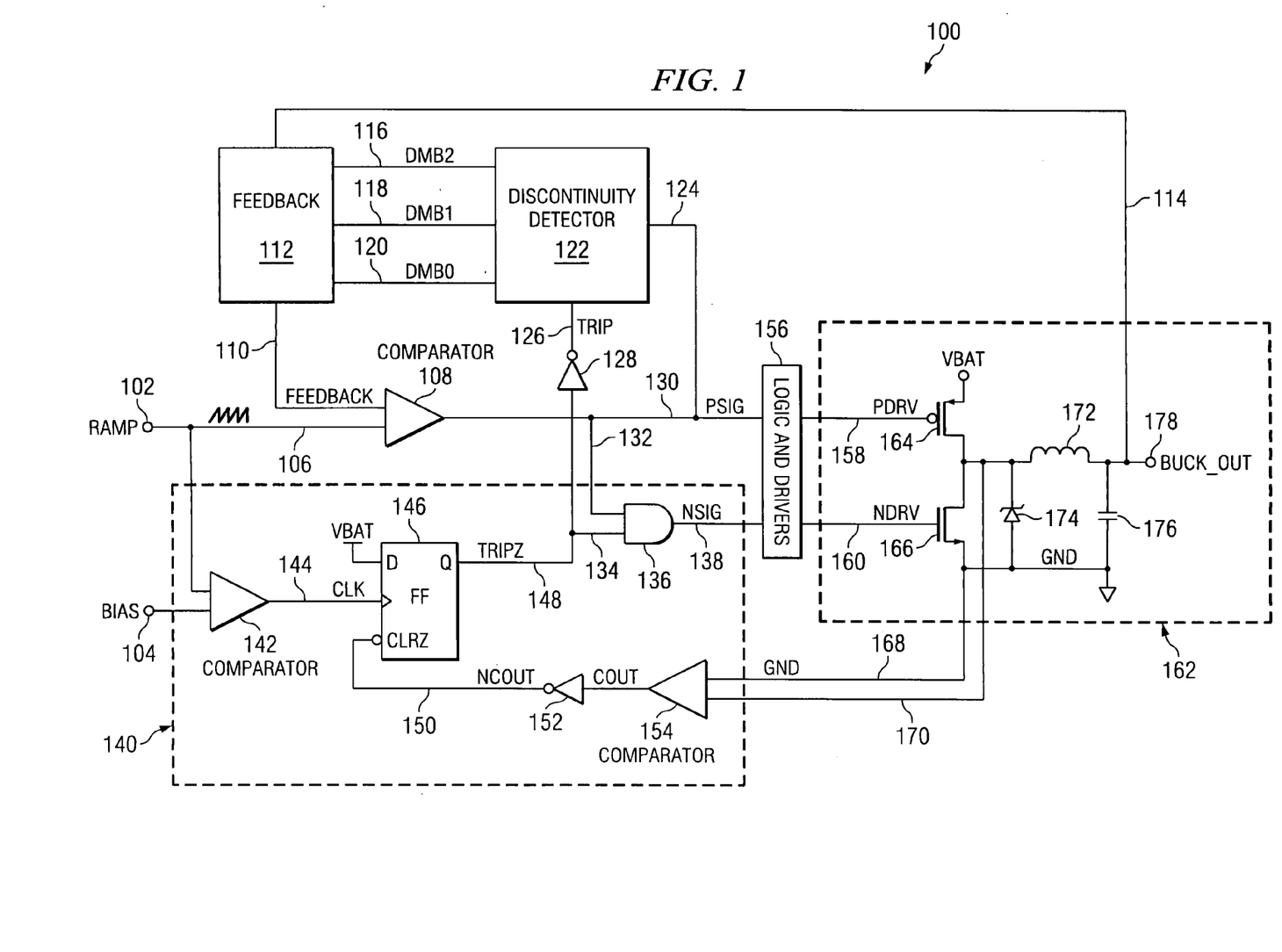
FIG. 1 is a schematic buck diagram of a buck converter according to the present invention.

FIG. 1 is a schematic block diagram of a buck converter in accordance with the present invention. As will be appreciated by those skilled the art, the same principles shown in FIG. 1 can be applied to boost converters or buck-boost converters. The buck converter is generally shown as 100 in FIG. 1. The converter 100 comprises a powertrain 162 which has a p-channel switch 164 having its source coupled to a source of power Vbat and its drain coupled to an inductor 172. The distal end of inductor 172 is coupled to output terminal 178. The junction of the drain of transistor 164 and inductor 172 is coupled by a freewheeling diode 174 to ground and an optional n-channel transistor 166 which has its drain connected to the junction of the drain of transistor 164 and inductor 172 and its source coupled to ground. Transistor 166 is thus coupled across the freewheeling diode 174 and operates as a synchronous rectifier. A capacitor 176 is coupled between the output 178 and ground. The transistors 164, 166 are operated by a standard logic and driver circuit 156 which is well known in the art and coupled to the transistors by lines 158, 160, respectively.

A TRIP circuit 140 is similar to the TRIP circuit utilized to control the synchronous rectifier 166 to prevent its conduction during discontinuous mode operation and discharge the capacitor 176. The TRIP circuit 140 has input lines 168 and 170 which are a coupled across the synchronous rectifier 166 and freewheeling diode 174. These signals are input to a comparator 154 which generates a signal COUT which is input to inverter 152. Inverter 152 generates a signal NCOUT on line 150 which is coupled to the CLRZ input of flip flop 146. The clock signal CLK for the flip flop 146 is generated by comparator 142 on line 144. The comparator 142 compares the ramp signal input at terminal 102 with a bias signal at terminal 104. The data input of flip flop 146 is coupled to the battery voltage Vbat. When the voltage sensed by inputs 168 and 170 across the freewheeling diode 174 drops to zero, which occurs when the current in the inductor drops to zero, the comparator 154 TRIPs. This signal is used in synchronous converter design as a way to prevent current flow through the synchronous transistor to discharge capacitor 176 to ground during discontinuous operation. This known type of controller causes the signal at the output of AND gate 136 to cause the drive signal NDRV on line 160 to fall, thus turning off synchronous transistor 166. When the TRIPZ signal falls and is latched, any more negative current through the synchronous rectifier is blocked. The signal remains latched until the clock CLK which is in synchronism with the signal PDRV on line 158, rises and the circuit begins watching for negative inductor current again.

Figure 2:
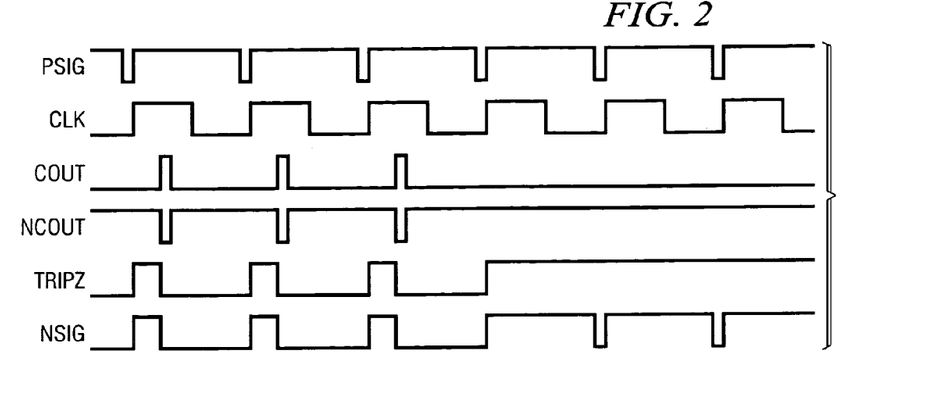
FIG. 2 shows the waveforms of the operating signals of the circuit of FIG. 1.

The signal TRIPZ is inverted by inverter 128 to generate the TRIP signal on line 126 which is an input to discontinuity detector 122. The ramp signal on terminal 102 is coupled via line 106 to comparator 108 where it is compared against the feedback signal on line 110. The output of comparator 108 on line 130 is fed into the logic and driver circuit 156 to drive the transistors 164 and 166, which is well known to one skilled in the art. The signal PSIG on line 130 is coupled via line 124 to the discontinuity detector 122. Discontinuity detector 122 generate signals DMB2, DMB1 and DMB0 which are fed into feedback circuit 112. The feedback circuit 112 also receives along line 114, the output voltage of the converter. Referring to FIG. 2, the signal PSIG is inverted by the logic and drivers circuit 156 to generate the drive signal PDRV which is applied to the gate of PMOS transistor 164. When there is a zero voltage condition across the freewheeling diode and optional synchronous rectifier transistor 166, comparator 154 generates the signal COUT which is inverted by inverter 152 to generate the signal NCOUT. The signal NCOUT is applied to the CLEAR input CLRZ of flip flop 146, which causes it to reset, driving the output signal TRIPZ to zero. The signal TRIPZ is applied to gate 136 to generate the signal NSIG which is used in prior art converters to turn off the synchronous rectifier transistor 166 to prevent reverse current flow. The signal TRIPZ stays low until the next clock pulse CLK generated by the comparator 142.

Figure 3:
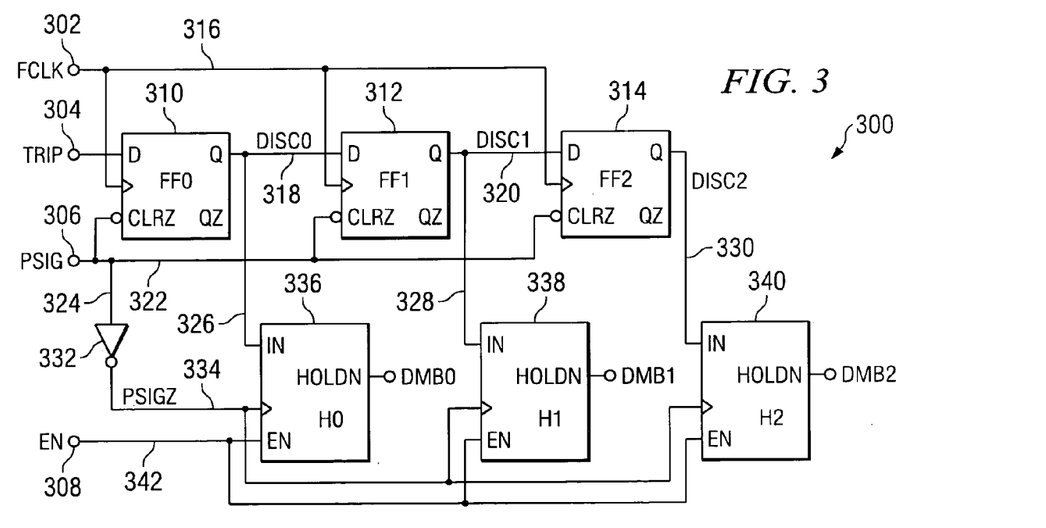
FIG. 3 is a schematic block diagram of a circuit to determine how soon the converter goes into discontinuous mode.

FIG. 3 shows a circuit used to determine the degree that the current in the inductor in the circuit of FIG. 1 is discontinuous, generally as 300. The circuit 300 can resolve the amount of time the converter spends in discontinuous mode to within a resolution of one quarter of the clock. As apparent to those skilled in the art, the circuit can be implemented by any number of stages of flip flops for increased resolution. A resolution of one-quarter of the clock requires 3 flip flops 310, 312, 314. The signal FCLK coupled to pin 302 is a fast clock which operates at approximately four times to the switching frequency of the converter. With every rising edge of the FCLK signal, the state of the signal TRIP is shifted in the chain of 3 flip flops 310, 312, 314. Since the signal FCLK is 4 times faster than the switching frequency of the converter, there will be four rising edges of the signal FCLK for each switching period of the converter. The first rising edge of the signal FCLK takes place at the same time as the rising edge of the signal PSIG and NSIG, there are only three rising edges the signal TRIP can rise before. If the signal TRIP rises before the second rising edge of the signal FCLK, a high-value is shifted all the way through the third flip flop. If it rises after the second rising edge of the signal FCLK, but before the third rising edge, it will only shift through the first and second flip flops. If the signal TRIP rises after the third rising edge, but before the fourth rising edge, then the high signal will only shift through the first flip flop.

Each of the flip flops 310, 312, 314 have an output on lines 326, 328 and 330, respectively, which is input to a second flip flop 336, 338 or 340, respectively. This second set of flip flops operate to insure that the discontinuity of the inductor current in the converter is steady, and not just caused by a transient, before the switching converter begins a correction for discontinuous mode operation. The output of the three flip flops 336, 338 and 340 are used to adjust to the feedback circuit 112 in FIG. 1. The signal PSIG at Terminal 306, which is coupled to the clock input of the flip flops 310, 312 and 314, is coupled to inverter 332 by line 324. Inverter 332 generates the clock signal PSIGZ on line 334. The enable signal on pin 308 is coupled via line 342 to the enable inputs of the flip flops 336, 338, 340.

Figure 4:
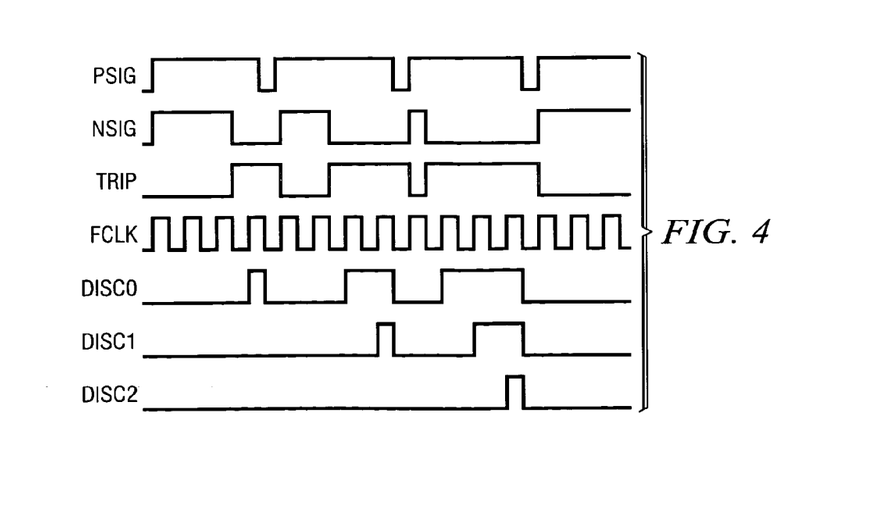
FIG. 4 shows the waveforms of the operating signals of the circuit of FIG. 3.

The operating waveforms for the circuit of FIG. 3 are shown in FIG. 4. As shown in FIG. 4, the output of the first flip flop 310 labeled DISC0, the output of the flip flop 312 labeled DISC1 and the output of the flip flop 314 labeled DISC2 shows the inverting input NSIG is dependent upon the value of the signal TRIP, which corresponds to the portion of the cycle during which the inductor is in discontinuous mode. As can be seen by the signal FCLK, the fast clock is approximately four times the frequency of the system clock. This can be seen by comparing this signal with the signal PSIG, which is the signal that, after being inverted by the Logic and Drivers circuit 156, is applied as the signal PDRV to the switching transistor 164.

Figure 5:
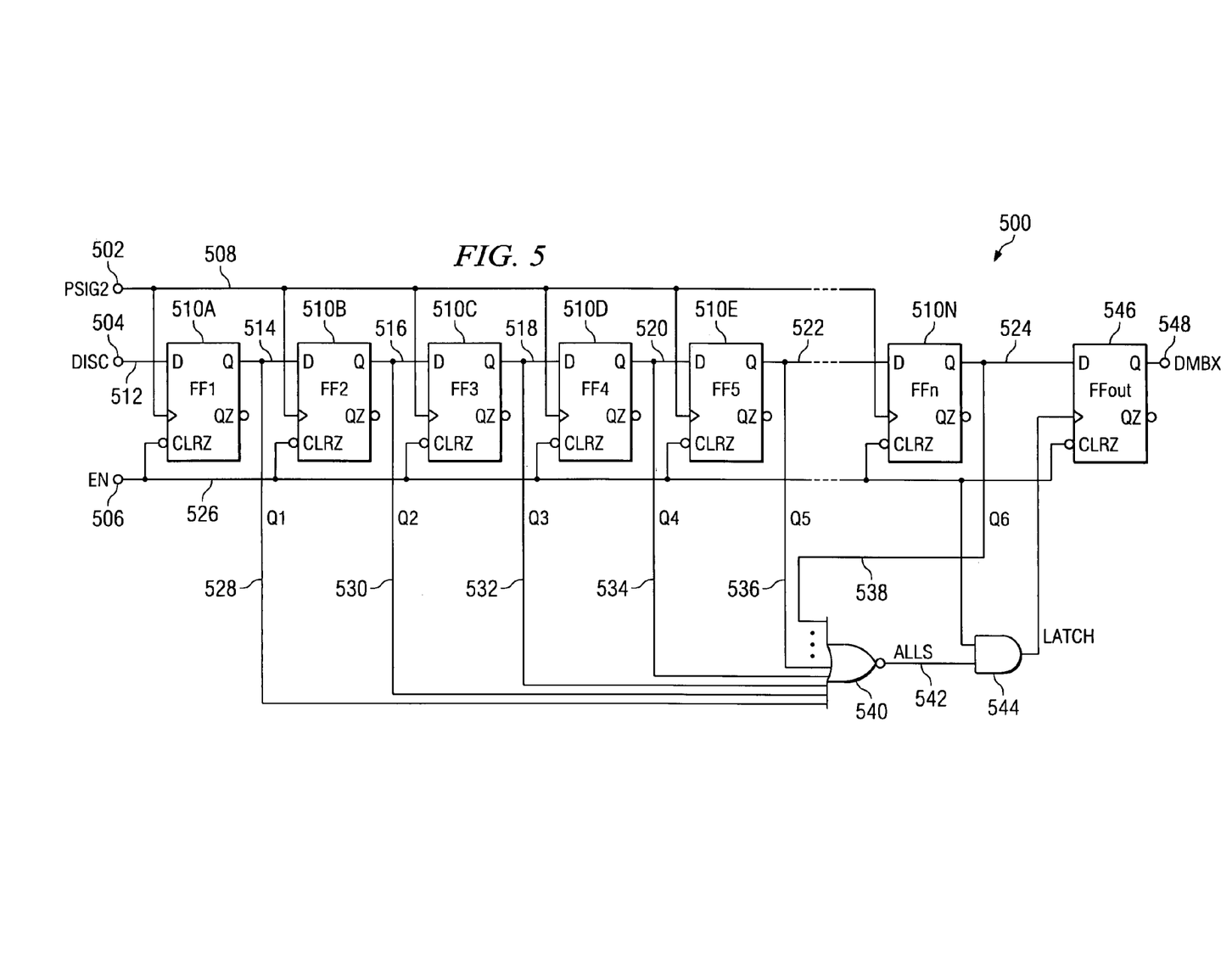
FIG. 5 is a schematic block diagram of a circuit that will block operation of the present invention due to a glitch in the TRIP signal.

Each of the flip flops 336, 338 and 340 of FIG. 3 represent each of the HOLDN cells which are illustrated in FIG. 5. The purpose of these HOLDN cells is to make sure that the discontinuous mode is steady and not just caused by transient glitch. The HOLDN cells each consist of flip flops 510A, 510B, 510C . . . 510N. The number of flip flops in the cell determines the time during which the signal must remain steady. The input to the chain of flip flops is the D input of the first flip flop in the chain which is coupled to the output of one of the flip flops 310, 312 or 314 in the circuit of FIG. 3. This is labeled DISCx in FIG. 5. The chain of flip flops is clocked by the signal PSIGZ so when the output DISCx is consistent through all N switching periods, that is the rising edges of the signal PSIGZ, the outputs of all the flip flops will be identical. If all the outputs of the flip flops are identical, then the output of the exclusive OR gate 540 will be high. As long as the enable signal is high, the output of the AND gate 544 will follow the state of the output 542 of the exclusive NOR gate 540. The output of gate 544, the LATCH signal, is coupled to the clock signal input of flip flop 546. The D input of flip flop 546 is coupled to the output of the last flip flop in the chain, flip flop 510N, by line 524. This allows the state of the output of one of the flip flops, DISCx, from flip flops 310, 312 or 314 to be latched after a number of switching cycles N, where the output remains unchanged and holds this until the state of the output of the flip flop 310, 312, or 314 changes and holds this new state for N number of cycles.

Figure 6:
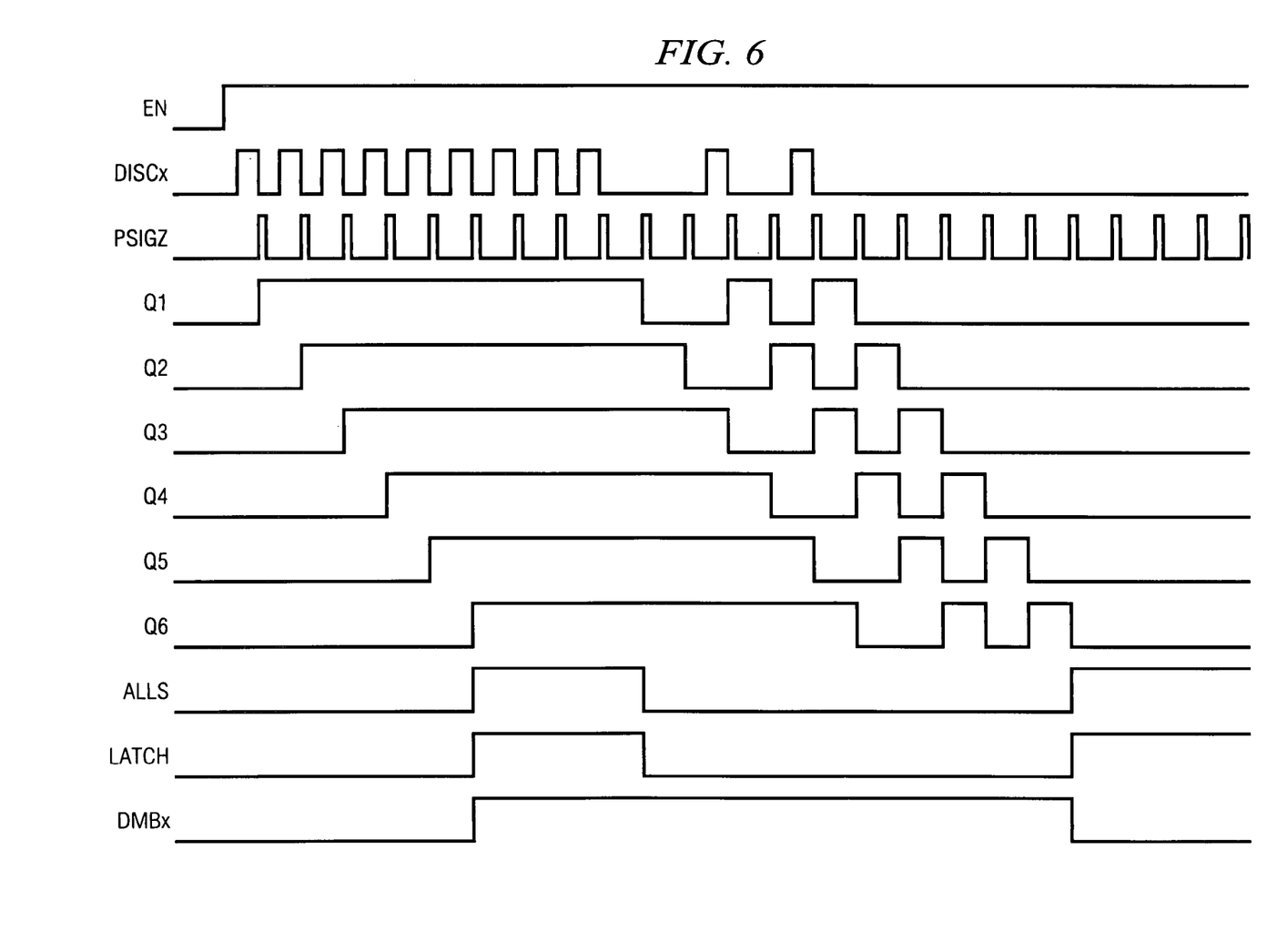
FIG. 6 shows the waveforms of the operating signals of the circuit of FIG. 5.

The waveforms for the operation of the circuit in FIG. 5 are shown in FIG. 6. The signal DISCx is one of the signals DISC1, DISC2 or DISC3 (FIG. 3). Once the enable signal EN goes high, the chain of flip flops 510 shifts the signal through the chain utilizing the inverted signal PSIG, designated PSIGZ, through the chain. At the end of N cycles, if the outputs of all of the flip flops 510, designated Q1, Q2, Q3, Q4, Q5 and Q6, are the same, the signal ALLS will generate the signal LATCH which will set the state of the Q output of the last ($N^{th}$) flip flop of the chain, here flip flop 510N, into flip flop 546 to generate the signal DMBx, which is one of the signals DMB0, DMB1 or DMB2 shown in FIG. 3.

The outputs of the three HOLDN cells, 336, 338 or 340 (see FIG. 3) are used to adjust the feedback network 112 of FIG. 1. The feedback network of the switching converter is shown generally as 700 in FIG. 7. The feedback network consists of a resistor divider comprising 11 resistors Ra, Rb, Rc, R0, R1, R2, R3, R4, Rd, Re and Rf, coupled between the output of the converter on pin 728 and ground. The resistors R1, R2, R3, and R4 are used to provide the converter with the ability to provide for different regulated output voltages. Voltage taps 738, 740, 742, 744 are coupled by lines 774, 776, 778 and 780 to multiplexer 782. Input signals on pin 786 and 788 are used by the multiplexer 782 to select one of the divider ratios that is provided by the four resistors R1, R2, R3 and R4. The selected output is coupled to the feedback terminal 784 which provides a feedback signal on line 110 in FIG. 1. The outputs of the discontinuity detector 122, shown as DMB0, DMB1, DMB2 in FIGS. 1 and 3, and labeled DMBx FIG. 5, are coupled to pins 706, 704, and 702, respectively in FIG. 7. The signal DMB2 on pin 702 is coupled via line 708 to the gate of an NMOS transistor 722. The transistor 722 is coupled between voltage taps 730 and 732. Line 708 is also coupled to inverter 770 which outputs this signal on line 772 to the gate of an NMOS transistor 756. Transistor 756 is coupled between voltage taps 746 and 748. The signal DMB1 at terminal 704 is coupled to an input of a 2-input OR gate 710. The other input is coupled to the signal DMB2 on line 708. The output of the OR gate 710 on line 718 is coupled to the gate of NMOS transistor 724. Transistor 724 is coupled between voltage taps 732 and 734. The signal line 718 is also coupled to inverter 766 which outputs a signal on line 768 which is coupled to the gate of NMOS transistor 758. Transistor 758 is connected across voltage taps 748 and 750. The signal DMB0 on pin 706 is coupled by line 715 to 3 input OR gate 716. The OR gate 716 also receives the signal DMB2 via the line 714 and the signal DMB1 on line 712. The output of OR gate 716 on line 720 is coupled to the gate of NMOS transistor 726 which is coupled between voltage taps 734 and 736. The signal on line 720 is also coupled to inverter 762 which outputs this signal on line 764 which is coupled to the gate of NMOS transistor 760. Transistor 760 coupled between voltage taps 750 and 752.

Figure 7:
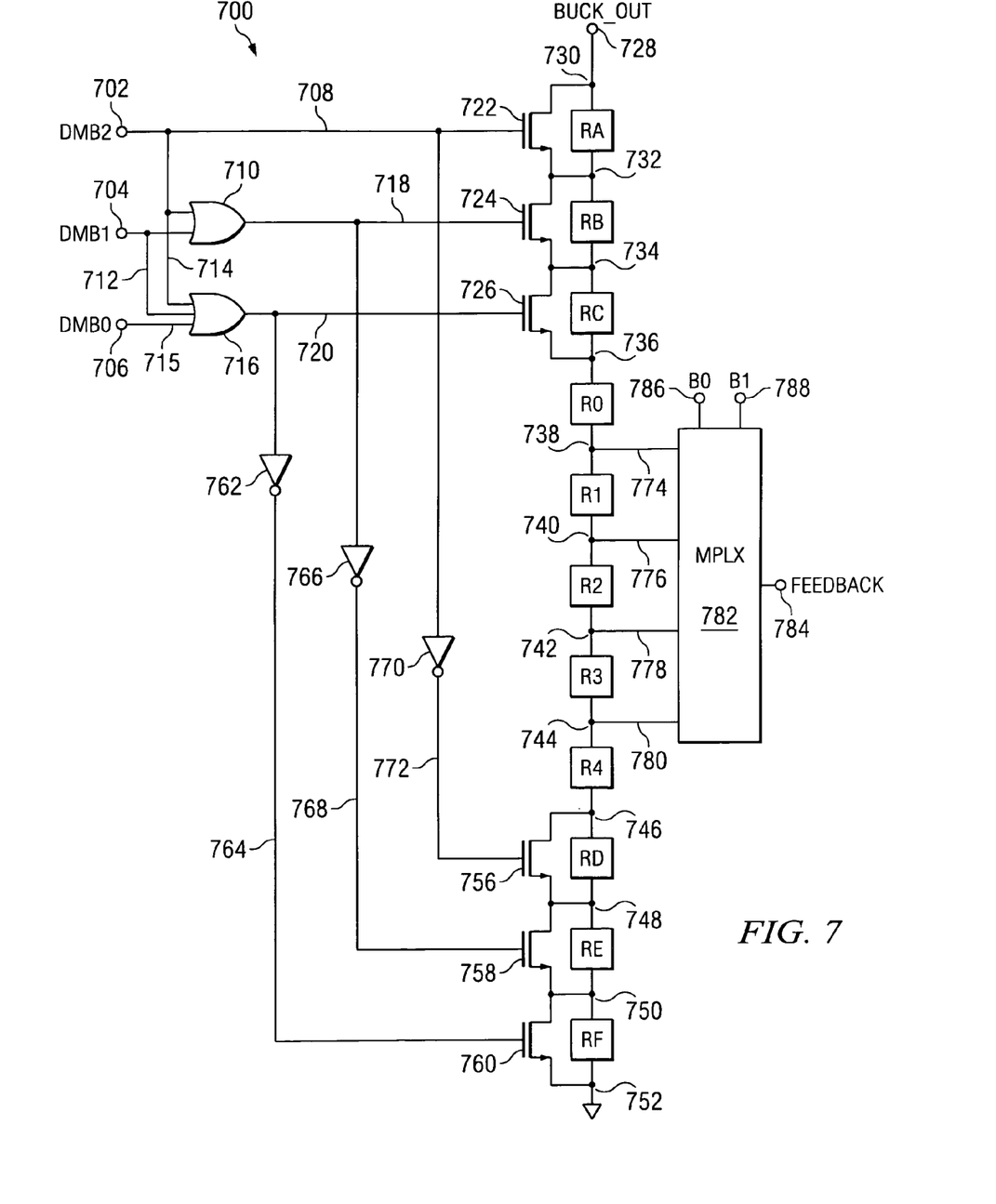
FIG. 7 is a schematic block diagram of the feedback block 112 of FIG. 1.

The outputs 702, 704, and 706 of the three HOLDN cells 336, 338 and 340 are used to adjust to the feedback network 112 and lower the output voltage of the switching converter while in discontinuous mode. As the inputs 702, 704 and 706 go high due to the converter being in discontinuous mode, they turn on a combination of MOS transistors 722, 724 and 726, by driving lines 708, 718, or 720 high to short out resistors Ra, Rb, or Rc. This also turns off a combination of transistors 756, 758 and 760, thus adding resistors Rd, Re or Rf into the resistor divider network. This causes an increase in the value of the feedback signal which generates a drop in the output of the converter. If a switching converter is heavily into the discontinuous mode the signals DMBZ, DMB1, and DMB0 would all be high activating transistors 722, 724 and 726 to short out resistors Ra, Rb, and Rc. At the same time, transistors 756, 758, and 760 would all be off adding resistors Rd, Rc, and Rf into the resistor string. This causes the maximum increase in the value of the feedback signal which generates a maximum drop in the output of the converter. If a switching converter is barely into discontinuous mode, the signal DMB0 at pin 706 would be high, activating only transistor 726 to short out only resistor Rc. Transistor 722 and 724 would be off. At the same time transistor 760 would be off thus adding resistor Rf into the resistor divider network. This causes a minimum increase in the feedback signal, which translates to a lower drop in the output voltage of the converter.

Figure 8A:
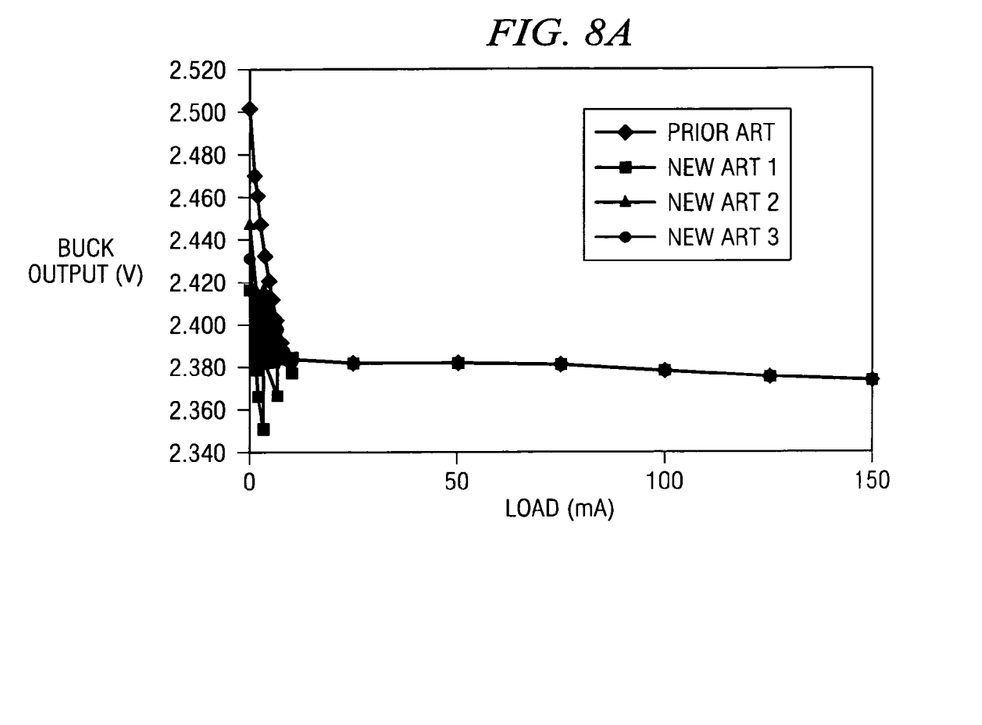
FIGS. 8a and 8b are graphs of theoretical converter characteristics showing the designers control over the output voltage of the present invention and the prior art.
Figure 8B:
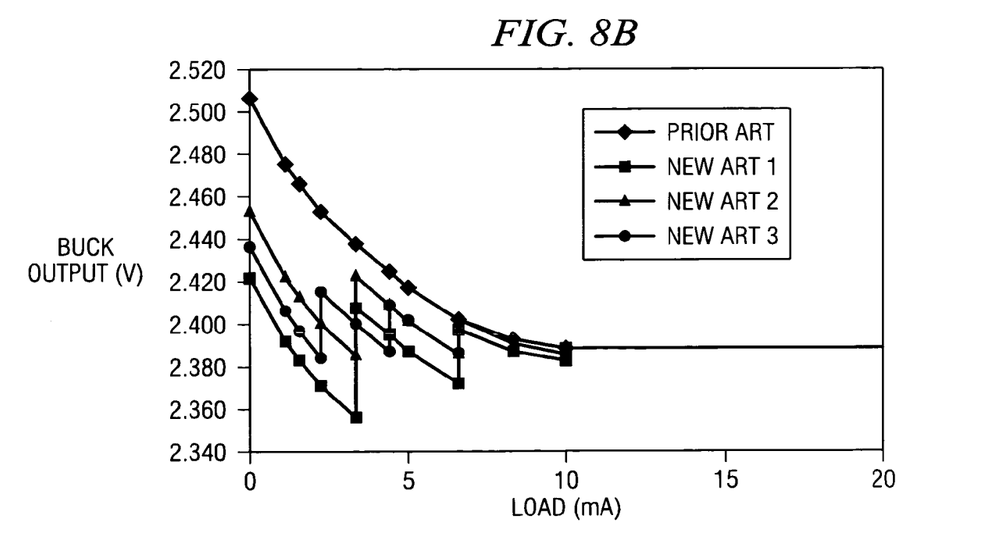

FIG. 8 shows several theoretical examples of how the present invention can effect the load regulation of a switching converter. FIG. 8A shows the output of a buck converter verses load currents between zero and 150 mA. Good regulation can be seen between approximately 10 mA and 150 mA. Poor regulation is apparent from the large variation in the output voltage between 0 and 10 mA. FIG. 8B magnifies the current of FIG. 8A between 0 and 20 mA. so that the variations can be more easily seen. The region between no-load (0 mA.) and 10 mA. shows the poor regulation of the converter in discontinuous mode and the improvement the new art can make to the load regulation.

Figure 9:
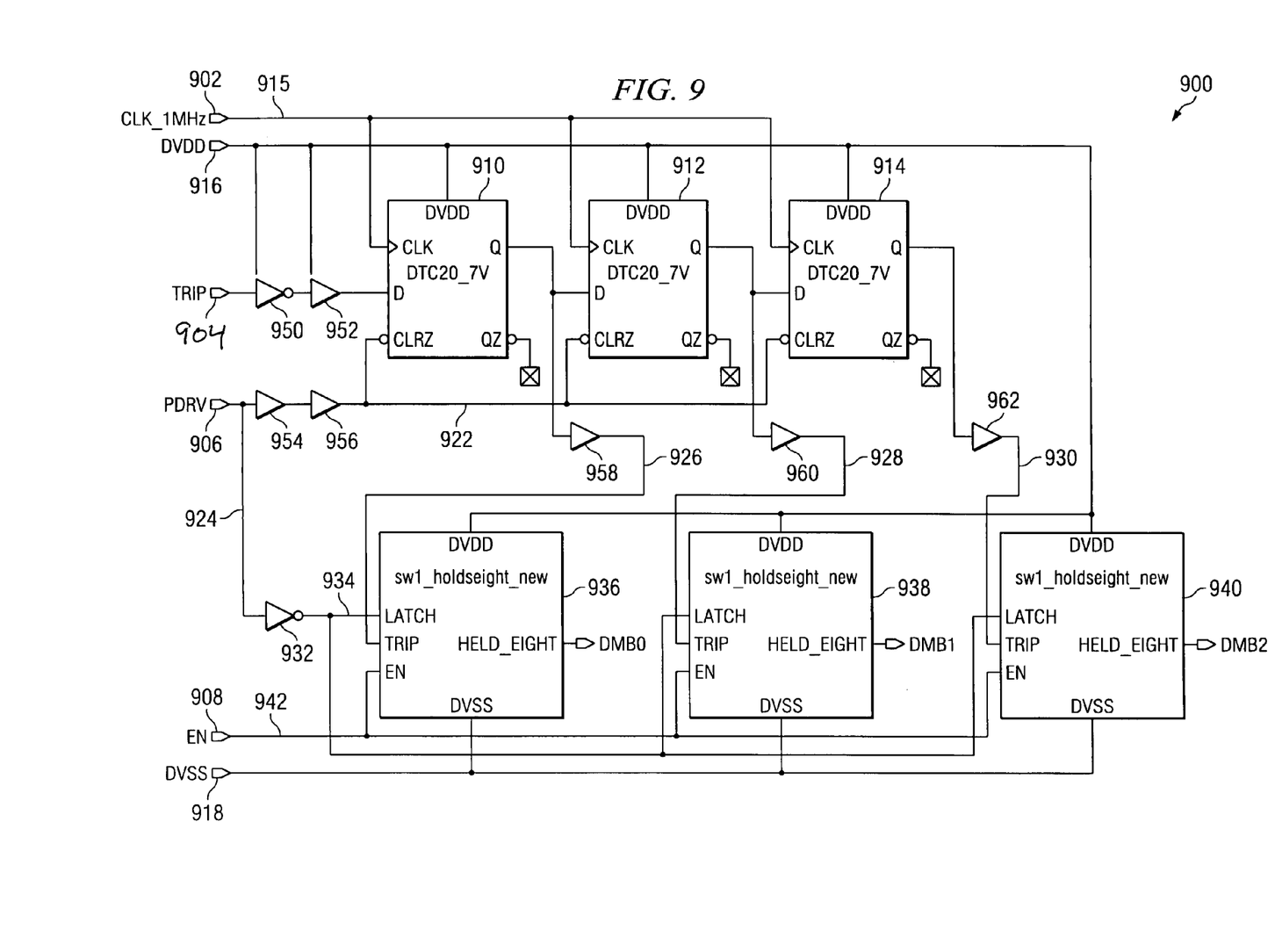
FIG. 9 is a circuit implementation of the schematic block diagram of FIG. 3.

FIGS. 9–12 illustrate a circuit implementation of the present invention. FIG. 9 corresponds to the circuit shown in FIG. 3. Elements having the same function have similar reference numerals in both figures. The fast clock FCLK is coupled to pin 902 and via line 915 to the clock inputs of flip flops 910, 912, and 914. The signal TRIP is applied to pin 904 and via inverter 950 and buffer 952 to the data input of flip flop 910. The signal PDRV is applied to pin 906 and via buffers 954, 956 to line 922 where is coupled to the CLRZ inputs of flip flops 910, 912 and 914. The signal PDRV is identical to the signal PSIG. The signal PDRV is applied via line 924 to inverter 932 which has an output on line 934 coupled to the latch input of flip flop 936 as well as to the latch inputs of flip flops 938 and 940. The enable signal on pin 908 is coupled to the enable inputs of flip flops 936, 938 and 940. Buffer amplifiers 958, 960 and 962 are applied between the outputs of the flip flops 910, 912 and 914, respectively and the inputs of flip flops 936, 938 and 940, respectively. Pin 916 is the application of the voltage VDD and pin 918 is at ground. The circuit for FIG. 9 functions identically with the circuit shown in FIG. 3.

Figure 10:
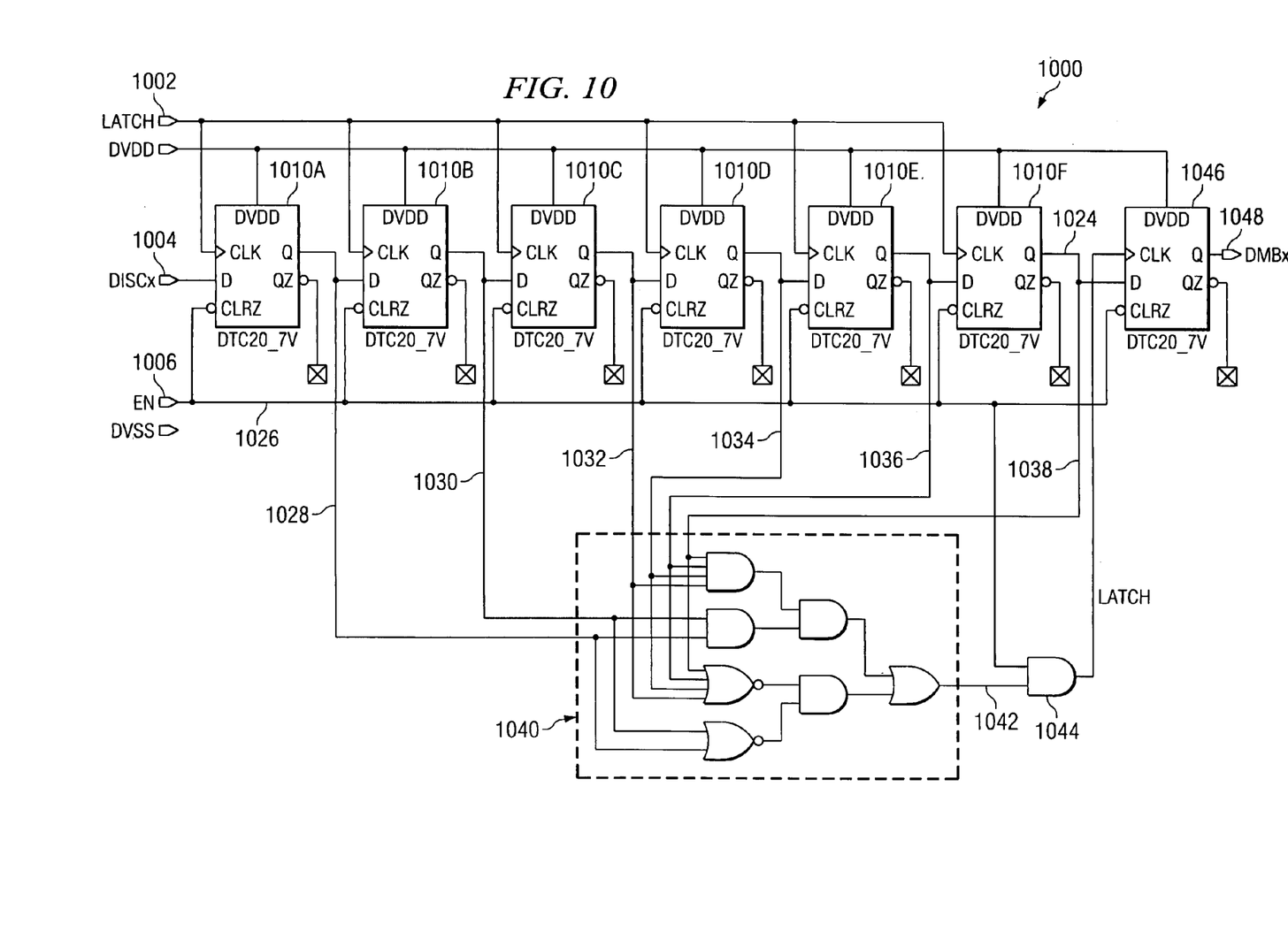
FIG. 10 is a circuit implementation of the schematic block diagram of FIG. 5.
Figure 11A:
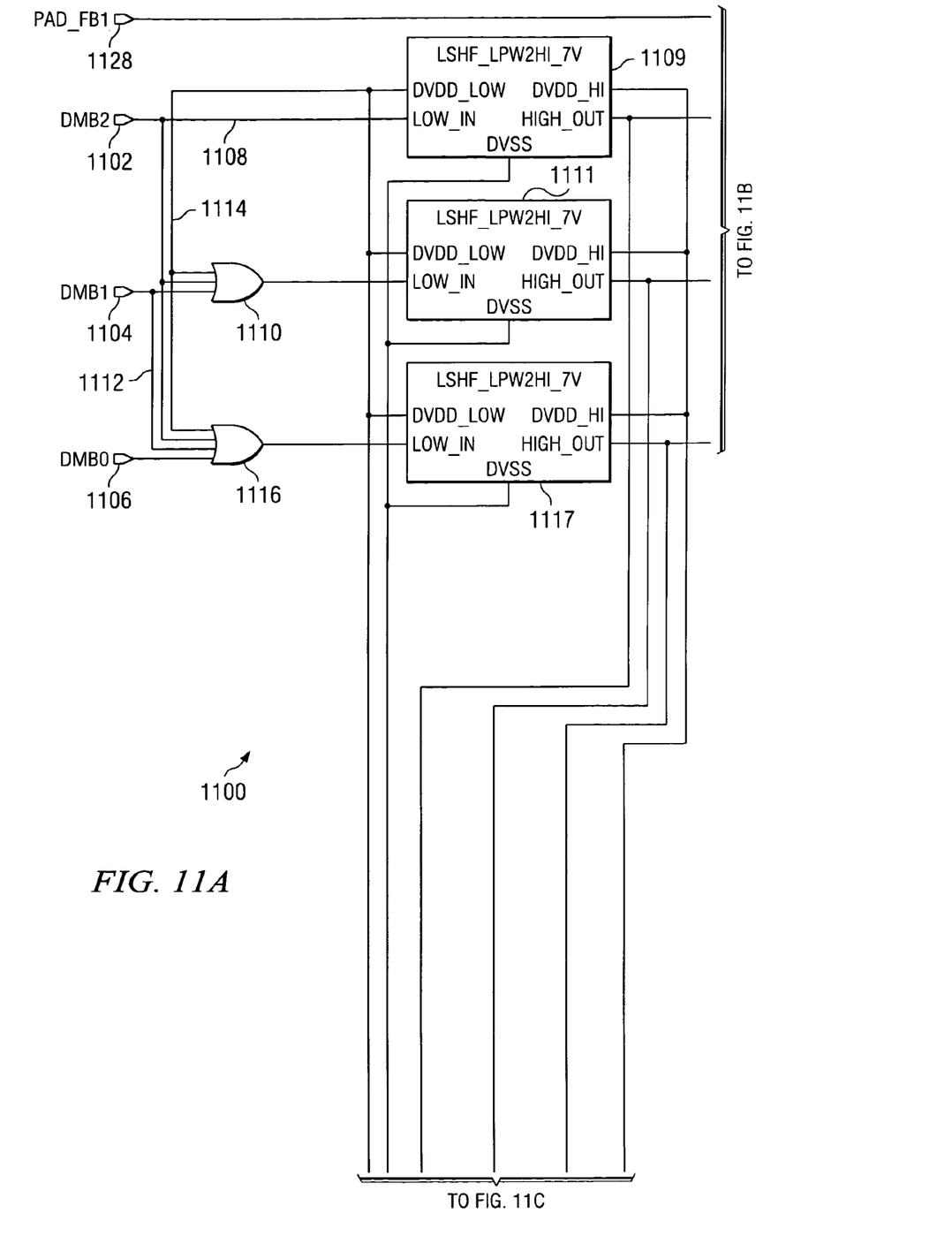
Figure 11B:
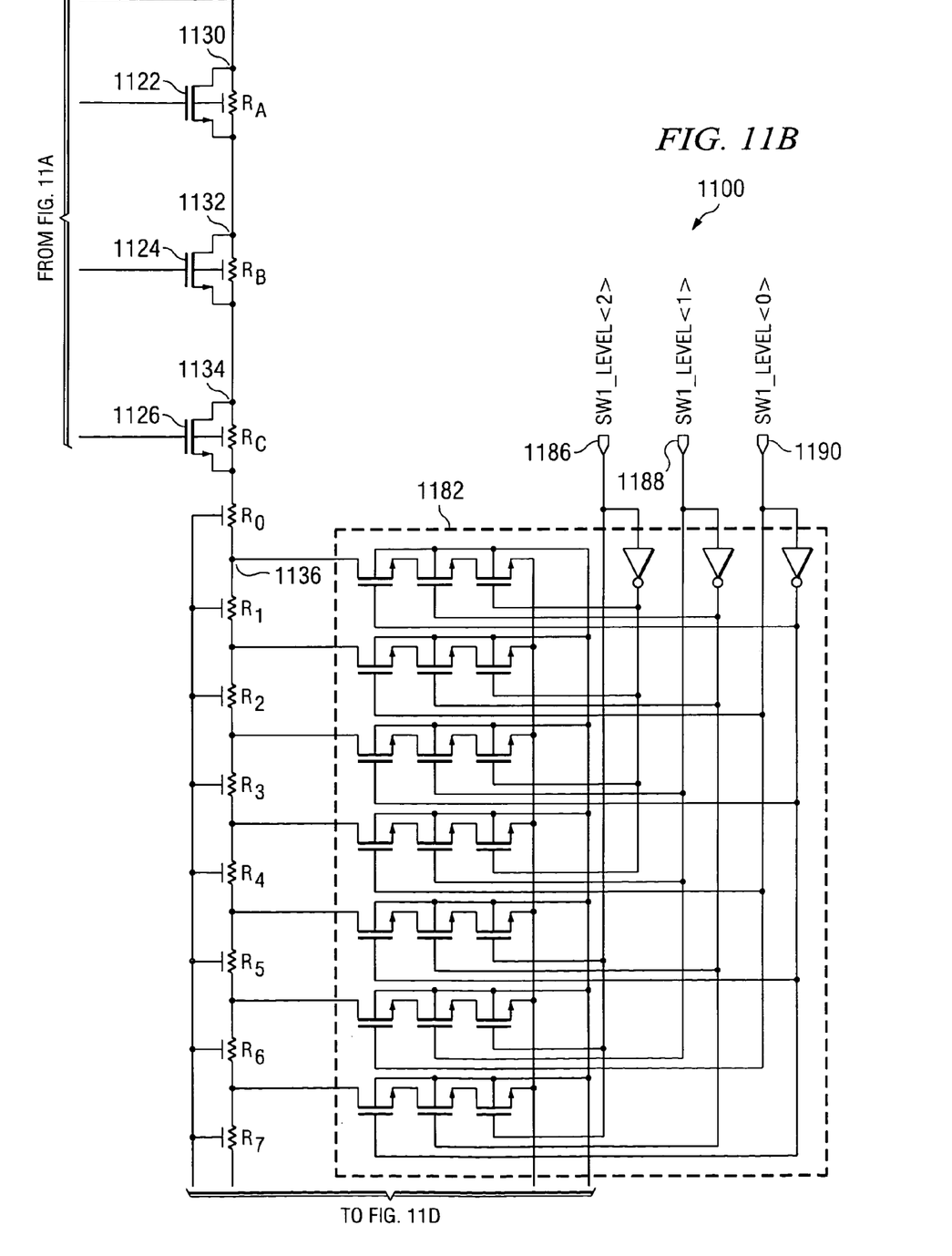
Figure 11C:
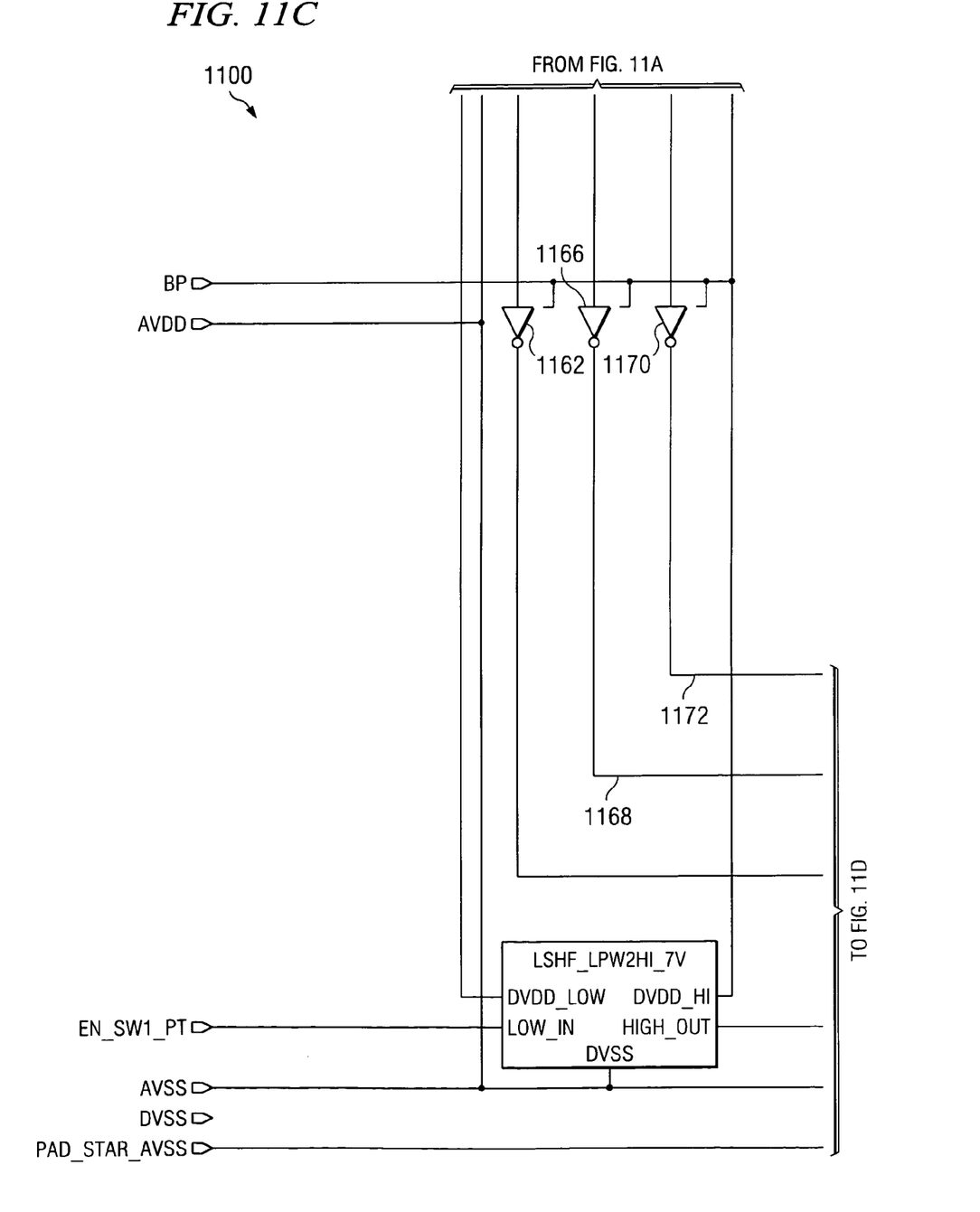
Figure 11D:
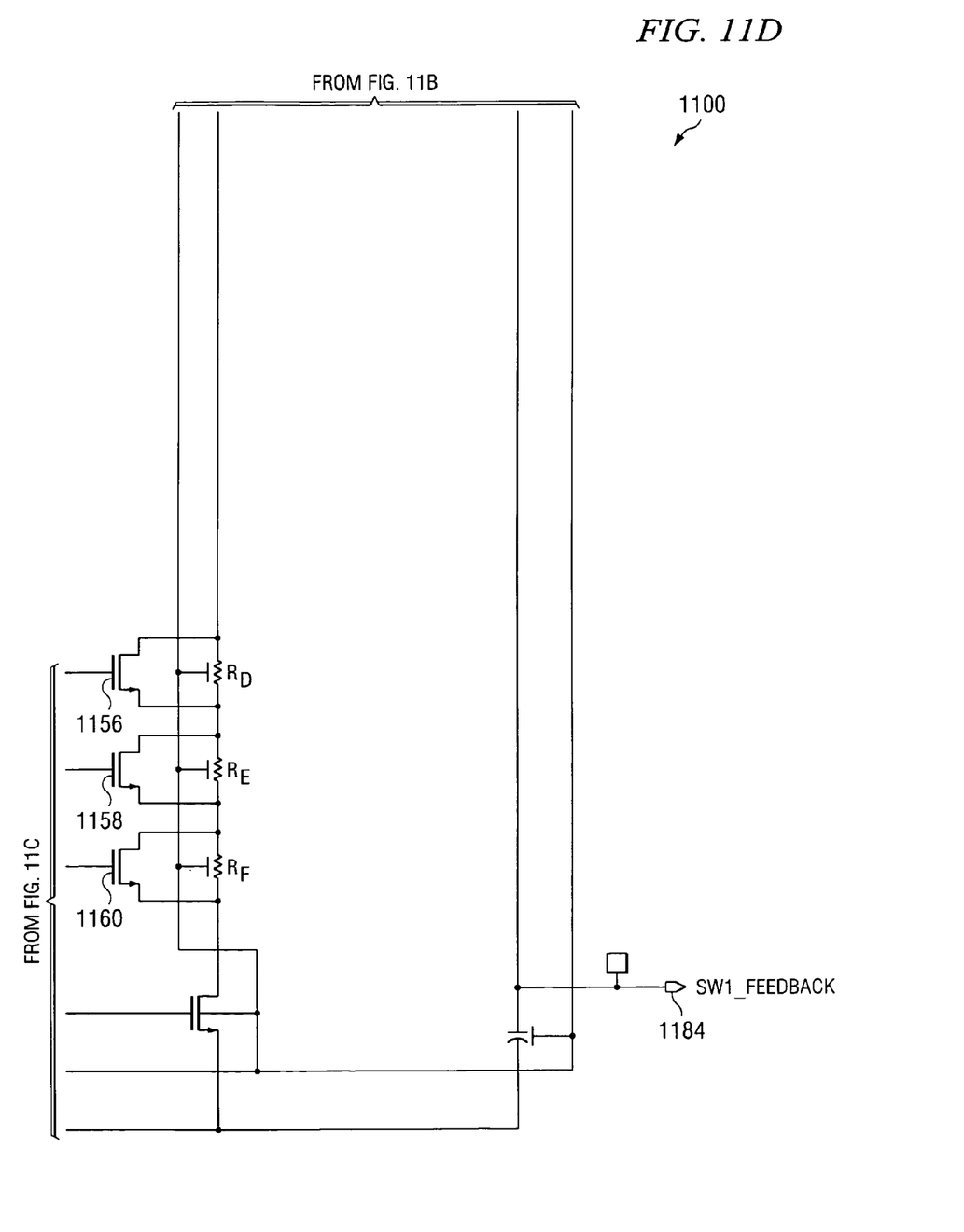

FIG. 10 corresponds to the circuit shown in FIG. 5 and illustrates the circuit 500 generally as 1000. The signal PSIGZ is applied as a latch signal to pin 1002 and applied to the clock input of flip flops 1010A, 1010B, 1010C, 1010D, 1010E and 1010F. The signal DISCx is applied to the D input of flip flop 1010A. The enable signal on pin 1006 is applied to the enable inputs of the flip flops. The outputs of the flip flops are coupled via lines 1028–1038 to the logic circuit 1040. The multiple input OR gate 540 is replaced by the logic circuit 1040 which performs the same function and generates a signal on line 1042 which is input to AND gate 1044 to generate a LATCH signal which is input to the clock input of flip flop 1046. Flip flop 1046 generates a signal DMBx on pin 1048. The output of the last flip flop in the chain, 1010F is coupled via line 1024 to the D input of flip flop 1046.

FIG. 11 illustrates the circuit 700 of FIG. 7 generally as 1100. The signal DMB2 is applied to pin 1102 and coupled via line 1108 through a level shifter 1109 and then to the gate of transistor 1122. The signal DMB1 applied to pin 1104 as one input to OR gate 1110, the other input of which is coupled to pin 1102. The output of OR gate 1110 is coupled through a level shifter 1111 to the gate of transistor 1124. The signal DMB0 is applied to pin 1106 and then to input of OR gate 1116, the other two inputs of which are coupled via lines 1112 and 1114 to pins 1104 and 1102, respectively. The output of OR gate 1116 is coupled through a level shifter 1117 to the gate of transistor 1126. Transistor 1122 is used to short resistor Ra, transistor 1124 is used to short transit resistor Rb and transistor 1126 is used to short resistor Rc. The multiplexer 1182 can accommodate a greater number of output selections than the multiplexer 782. Multiplexer in 1182 has three inputs 1186, 1188 and 1190 to select between the six potential output voltages where as the multiplexer 782 has two inputs 786 and 788 to choose among four potential output voltages. The output of the multiplexer 1182 is coupled to pin 1184 and is applied to the feedback line 110 in FIG. 1. The signals utilized to drive transistors 1122, 1124 and 1126 are inverted by inverters 1162, 1166 and 1170. The outputs of these inverters are used to drive the transistors 1156, 1158 and 1160, respectively to short out resistors Rd, Re and Rf, respectively.

Figure 12:
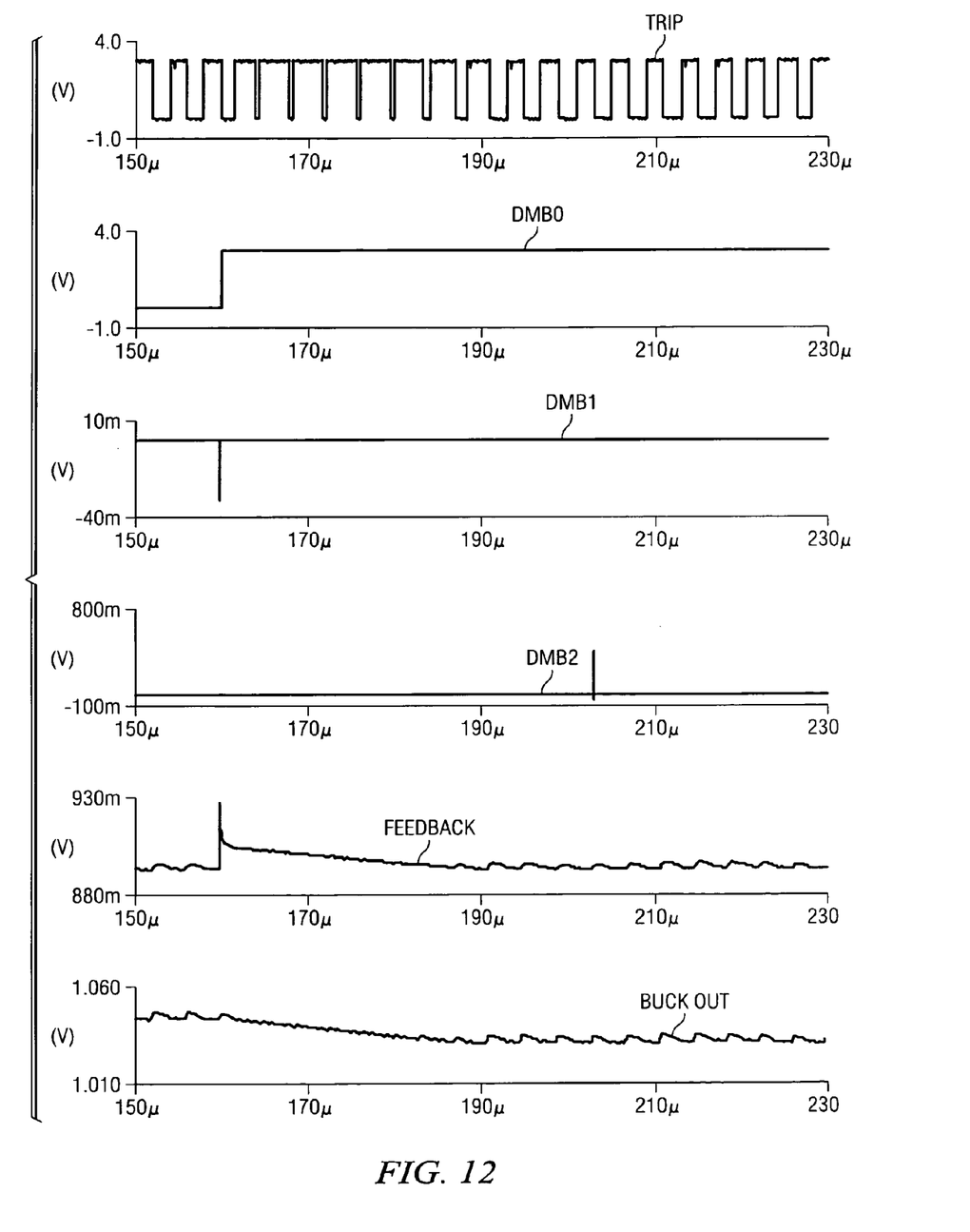
FIG. 12 illustrates a simulated response of the circuits shown in FIGS. 9–11D and FIG. 13 is a schematic block diagram of a boost converter in accordance with the present invention.

FIG. 12 illustrates a simulated response to the circuit shown in FIGS. 9–11 in the system shown in FIG. 1. As shown in FIG. 12, when the system enters discontinuous mode, the signal DMB0 rises causing a spike in the feedback signal followed by a gradual taper back to the steady state voltage. Looking at the output of the converter, labeled "BUCK OUT", there is a gradual drop in the output voltage after the spike in the feedback voltage gradually tapering to a lower steady state voltage. This shows that the circuit of the present invention is able to compensate for the discontinuous mode operation and return the voltage back to the desired voltage of the converter.

Figure 13:
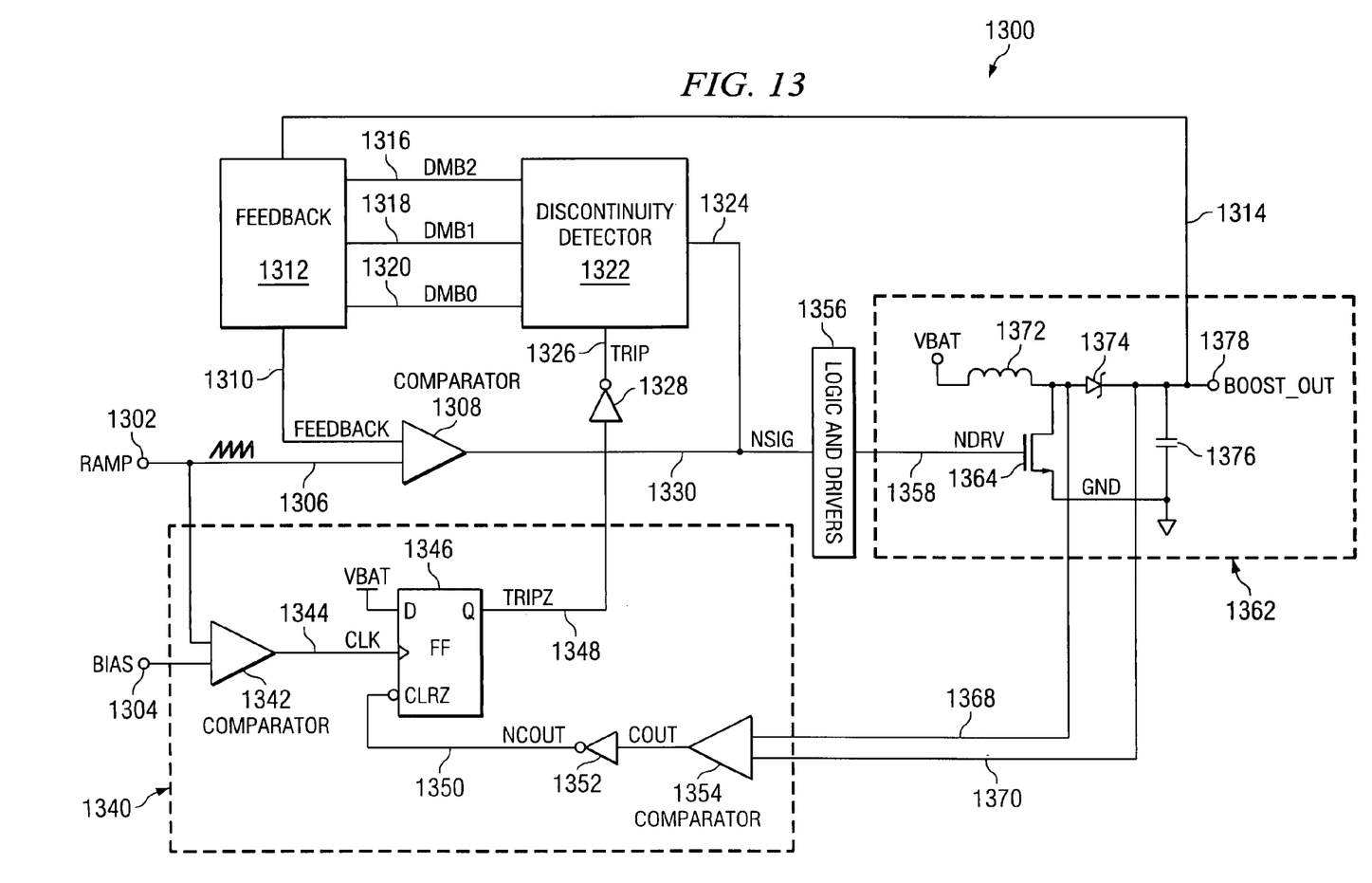

FIG. 13 is a schematic block diagram of a boost converter in accordance with the present invention. This schematic block diagram is similar to the schematic block diagram of FIG. 1. In FIG. 13, like elements have similar reference numerals. The boost converter is generally shown as 1300 in FIG. 13. The converter 1300 comprises a powertrain 1362 which has an n-channel switch 1364 having its source coupled to ground and its drain coupled to an inductor 1372. The distal end of inductor 1372 is coupled to a source of power Vbat. The junction of the drain of transistor 1364 and inductor 1372 is coupled by a freewheeling diode 1374 to output terminal 1378. A synchronous rectifier transistor is not utilized in this embodiment, but can be used, if desired. A capacitor 1376 is coupled between the output 1378 and ground. Transistor 1364 is operated by a standard logic and driver circuit 1356 which is well known in the art and coupled to the transistor by line 1358.

A TRIP circuit 1340 is similar to the TRIP circuit utilized to control a synchronous rectifier to prevent its conducting during discontinuous mode operation and thus discharge the capacitor 1376. Although a synchronous rectifier is not utilized in this design, the TRIP circuit is utilized to compensate the output voltage during discontinuous mode. The TRIP circuit 1340 has input lines 1368 and 1370 which are coupled across the freewheeling diode 1374. These signals are input to a comparator 1354 which generates a signal COUT which is input to inverter 1352. Inverter 1352 generates a signal NCOUT on line 1350 which is coupled to the CLRZ input of flip flop 1346. The clock signal CLK for the flip flop 1346 is generated by comparator 1342 on line 1344. The comparator 1342 compares the ramp signal input at terminal 1302 with a bias signal at terminal 1304. The data input of flip flop 1346 is coupled to the battery voltage Vbat. When the voltage sensed by input 1368 and 1370 across the freewheeling diode 1374 drops to zero, which occurs when the current in the inductor drops to zero, the comparator 1354 TRIPs. The TRIPZ signal remains latched until the clock CLK which is in synchronism with the signal NDRV on line 1358, falls and the circuit begins watching for negative inductor current again.

The signal TRIPZ is inverted by inverter 1328 to generate the TRIP signal on line 1326 which is an input to discontinuity detector 1322. The ramp signal on terminal 1302 is coupled via line 1306 to comparator 1308 where it is compared against the feedback signal on line 1310. The output of comparator 1308 on line 1330 is fed into the logic and driver circuit 1356 to drive the transistor 1364, which is well known to one skilled in the art. The signal NSIG on line 1330 is coupled via line 1324 to the discontinuity detector 1322. Discontinuity detector 1322 generate signals DMB2, DMB1 and DMB0 which are fed into feedback circuit 1312. The feedback circuit 1312 also receives along line 1314 the output voltage of the converter. When there is a zero voltage condition across the freewheeling diode comparator 1354 generates the signal COUT which is inverted by inverter 1352 to generate the signal NCOUT. The signal NCOUT is applied to the CLEAR input CLRZ of flip flop 1346, which causes it to reset, driving the output signal TRIPZ to zero. The signal TRIPZ stays low until the next clock pulse CLK generated by the comparator 1342.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. In a switching mode converter having a switching transistor and an inductor, a discontinuous mode control circuit comprising:
   a discontinuity detector coupled to the inductor that detects when the converter enters the discontinuous mode to generate a TRIP signal, the discontinuity detector determining the portion of a cycle of the switching transistor during which the converter is in discontinuous mode; and
   a feedback controller coupled to an output of the converter and to the discontinuity detector, which alters a feedback control signal of the converter responsive to the determined portion of the cycle of the switching transistor during which the converter is in discontinuous mode; and
   further comprising a freewheeling diode coupled to the inductor to discharge magnetic field energy stored in the inductor when the switching transistor shuts off; and wherein the discontinuity detector comprises a comparator coupled across the freewheeling diode and detecting when voltage across the diode is an appropriate polarity for reverse current flow to generate the TRIP signal.

2. The circuit of claim 1 wherein the discontinuity detector comprises a timing means which starts a timing interval when the inductor enters discontinuous mode and ends the timing interval when the switching transistor is driven to start the next cycle.

3. The circuit of claim 2 wherein the timing means comprises a plurality of flip flops connected in series, a clock signal at a frequency higher than a drive frequency for the switching transistor being coupled to the clock input for each flip flop and a data input of the first of the plurality of flip flops receiving the TRIP signal, whereby each time the clock signal transition clocks a flip flop while the TRIP signal is present, the plurality of flip flops will continue to change state.

4. The circuit of claim 3 wherein the plurality of flip flops comprises 3 flip flops.

5. The circuit of claim 3 wherein the frequency of the clock signal is 4 times the frequency of the drive signal to the switching transistor.

6. The circuit of claim 2 further comprising a second timing circuit coupled to an output of the timing means for determining that the switching mode converter remains at a particular level of the discontinuous mode for n cycles, where n=any integer.

7. The circuit of claim 1 further comprising a plurality of flip flops connected in series, a clock signal at a frequency higher than a drive frequency for the switching transistor being coupled to the clock input for each flip flop and a data input of the first of the plurality of flip flops receiving the TRIP signal, whereby each time the clock signal transition clocks a flip flop while the TRIP signal is present, the plurality of flip flops will continue to change state.

8. The circuit of claim 7 wherein the plurality of flip flops comprises 3 flip flops.

9. The circuit of claim 7 wherein the frequency of the clock signal is 4 times the frequency of the drive signal to the switching transistor.

10. The circuit of claim 7 further comprising a second timing circuit coupled to an output of the plurality of flip flops for determining that the switching mode converter remains at a particular level of the discontinuous mode for n cycles, where n=any integer.

11. The circuit of claim 1 wherein the feedback controller is coupled to a voltage divider coupled across an output of the converter for changing an output value of the voltage divider.

12. The circuit of claim 1 wherein the switching mode converter is a buck converter.

13. The circuit of claim 1 wherein the switching mode converter is a boost converter.

* * * * *